US 6,175,570 B1

(12) United States Patent
Cukier et al.

(10) Patent No.: US 6,175,570 B1
(45) Date of Patent: *Jan. 16, 2001

(54) METHOD AND AN APPARATUS FOR SHAPING THE OUTPUT TRAFFIC IN A FIXED LENGTH CELL SWITCHING NETWORK NODE

(75) Inventors: Maurice Cukier, Nice; Rene Gallezot, Cagnes sur Mer; Jocelyne Jaumes, Pibrac; Thierry Roman, Nice; Daniel Wind, Drap, all of (FR)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/760,205

(22) Filed: Dec. 4, 1996

(30) Foreign Application Priority Data

Dec. 20, 1995 (EP) .................................. 95480184

(51) Int. Cl.$^7$ ........................... G01R 31/08; H04L 12/26; H04L 12/28; G08C 15/00

(52) U.S. Cl. ........................... 370/414; 370/230; 370/235; 370/463; 370/420

(58) Field of Search .................................... 370/395, 412, 370/392, 389, 465, 470, 394, 405, 218, 216, 217, 229, 230, 231, 235, 428, 429, 398, 232, 413, 414, 417, 418, 463, 420; 340/825.52

(56) References Cited

U.S. PATENT DOCUMENTS 5,274,641 * 12/1993 Shobatake et al. .................. 370/392
5,311,509 * 5/1994 Heddes et al. .................... 370/412 X
5,414,707 * 5/1995 Johnston et al. .................... 370/395

(List continued on next page.)

FOREIGN PATENT DOCUMENTS 2288097 10/1995 (GB).

OTHER PUBLICATIONS

New Orleans Supercomm/ICC '94, Serving Humanity Through Communications, 1994 IEEE Int'l Conf. on Communications, May 1, 1994, p. 106–110, "Worst deterministic pattern allocation: a viable approach to attain statistical gain in ATM", Baiocchi et al.

IEEE in Houston, Globecom '93, IEEE Global Telecommunications Conference, Including a Communications Theory Mini–Conference. Technical Program Conference Record (Cat. No. 93CH3250–8), Proceedings of Globecom '93, IEEE Global Telecommunications Confere, vol. 3 of 3, Nov. 29, 1993, pp. 1844–1848, vol. 3, XP000436128, Marino et al, "A Hardware Platform for B–ISDN Services Multiplexing: Design and Performances of AAL and ATM Layers".

*Primary Examiner*—Huy D. Vu
*Assistant Examiner*—Kevin C. Harper
(74) *Attorney, Agent, or Firm*—Cesari and McKenna (57) ABSTRACT

A network node supports switching fixed length information cells between a source unit and a destination unit. The invention uses two lookup tables called the active and the standby calendars for each of said output line. Each entry in the calendars represents the position of one cell in the output cell stream which will be sent onto said output lines. While the active calendar is controlling the network cell multiplexing onto a node output line, the standby calendar is updated at each traffic change by looking for a calendar free position for the new traffic starting with a targeted theoretical entry position. A Free Location Table (700) is used, storing the calendar organized by pages. The standby calendar updating starts with reading a Free Location Table page pointed at by the most significant bits of the theoretical entry. Should said page contain only ones (i.e., no free cell position) looking for the nearest page containing at least one zero (i.e., free cell position) and updating the Table and standby calendar accordingly, and then swapping calendars.

19 Claims, 8 Drawing Sheets

U.S. PATENT DOCUMENTS 5,483,527 * 1/1996 Doshi et al. .................... 370/465 X
5,548,587 * 8/1996 Bailey et al. ........................ 370/395
5,602,830 * 2/1997 Fichou et al. ........................ 370/232
5,818,815 * 10/1998 Carpenter et al. ................... 370/218

* cited by examiner

METHOD AND AN APPARATUS FOR SHAPING THE OUTPUT TRAFFIC IN A FIXED LENGTH CELL SWITCHING NETWORK NODE

FIELD OF THE INVENTION

This invention deals with problems of traffic control in the fixed length cells switching high speed networks and more particularly with a shaping method and apparatus to be implemented in an ATM network node.

BACKGROUND OF THE INVENTION

The basic advantage of the new high bandwidth, low delay, fixed length cell based transfer mode techniques, such as Asynchronous Transfer Mode (ATM), is to allow multiplexing and switching of different types of information over the same network: data, voice, image, video, while optimizing the bandwidth and resources utilization.

To that end, the various network user's traffic are split into fixed and/or variable length data packets (or blocks) which are then split into fixed length cells in an ATM type network. The basic problem is to conveniently orient these cells within the network bearing in mind that thousands of users connected to the same network shall share the same network link. In a high speed transmission environment, and with users operating essentially in burst mode and at different speed from one another, one may easily understand that conflicts and congestions can occur within the network.

Congestion control inside these networks is one of the major problems to be resolved. As the cells are short, no space is allocated in their headers to enable error recovery for the cell payload (i.e. users data). If one cell of the block has been lost or discarded by the network in case of network congestion, error recovery is performed at the higher-level by recovery protocols retransmitting the user data block. The error rate being extremely low in the internode links, cells lost because of random errors is not a potential problem. However, when a node discards cells for reason of traffic congestion, it is unlikely that these cells will come from a small number of logical data blocks. Discarding 1000 cells, if the average user data blocks length is 2KBytes (a low estimate), sent as 43 cells, may cause the network to absorb a retransmission of 43,000 cells! This case indeed is the worse case when the 1000 messages come from 1000 different connections. That is why the protocols need to be efficient enough to minimize congestion problems in this type of networks.

In the ATM connection-oriented networks, the end-to-end traffic of data for one user, between the source and the destination, is represented by a Virtual Connection (VC); several Virtual Connections may be grouped in a Virtual Path (VP) that can be switched as a unit. The bandwidth is allocated dynamically, based on predefined conditions and agreements with each user, as part of a connection setup signalling procedure that precedes end-to-end information exchange. At call admission time, the source user provides, in addition to the destination point, a set of parameters, called the traffic descriptors, which attempt to describe the traffic that will be generated onto the links. For instance, a mandatory descriptor is the peak cell rate of the connection, R. If this parameter is sufficient to fully describe Constant Bit Rate (CBR) connections, i.e., periodic stream of cells such as uncompressed voice, further parameters are necessary to describe Variable Bit Rate (VBR) connections such as those for video traffic. The burst of traffic is measured by the average cell rate and the average duration of an emission at the peak rate R in most of the high speed networks literature. As indicated above, in ATM networks, cells may be lost or unacceptable delays can be induced in case of traffic congestion. Depending on the type of traffic conveyed over the ATM network, the first or the second just mentioned behavior of the network, in case of congestion, may damage the quality of traffic over the virtual connections: for voice traffic, cells can be lost but a delay in transmission is unacceptable. When pure data is transferred on the virtual connection, the delay can be acceptable but not the cell loss. That's why the network guarantees a Quality of Service (QoS). The QoS guaranteed by a network is, in most cases, expressed in terms of cell loss probability and maximum end-to-end delay for a cell, independently of network topologies and protocols. One can note that the end-to-end delay between two users is increased if the end-to-end connection crosses different network entities (private or public carrier networks) which have their own protocols and traffic management.

In order to meet the QoS, the network nodes have to control the traffic congestion both at connection admission time and once the connection is established.

At connection admission time the access node has to decide if it can accept the connection or not: its decision is based on the actual load of the links, and its analyzis of the traffic parameters of the connection. Moreover, it has also to compute a path table to carry this overload of traffic through the different nodes. If no path is found, the call is rejected. It is important to note that the decision to accept a new call has to be taken not only if the network node estimates that the QoS for the connection will be met but also if it is sure that the added traffic will not have a significant impact on the QoS of all the connections already established.

A first control on traffic congestion, once the connection is established, is performed by the policing function implemented in a device, the policer, of the network access node adapter. The policer will detect and penalize the violation of the peak cell rate on the current traffic compared to the one required at call set up.

Instead of the peak cell rate, another descriptor the Sustainable Cell Rate, (SCR) can be used as a criterion for the policing function. Accordingly, any reference to the peak cell rate can be replaced by SCR. The policing function is also referred to, in the ATM literature, as the Network Parameter Control (NPC) or the Usage Parameter Control (UPC) depending on whether the source unit is a Network Node or a Customer Premise Node (or port). Indeed, an efficient policing function should be transparent as long as the traffic characteristics provided by the source at call setup are met. This means that the policing algorithm should discard or tag as discardeable, user cells unless the cell loss probability is less than or equal to the one defined by the QoS. On the other hand, the policing function will also discard or tag the cells that are in excess versus the peak cell rate provided at call set up.

A second control of traffic congestion consists in shaping the output network node traffic by spacing the cells departures in such a way that the time between two departures of cells for the same connection shall never be below the minimal value negotiated at connection setup time. It has been shown that, on the average, the multiplexing of spaced cells tends to decrease the 'burstiness' of the aggregate traffic and then allows a better utilization of the network resources. This invention shall essentially focus on this second aspect of traffic congestion, and accordingly shall be implemented within (or combined with) the shaping device (shaper).

Figure 1:
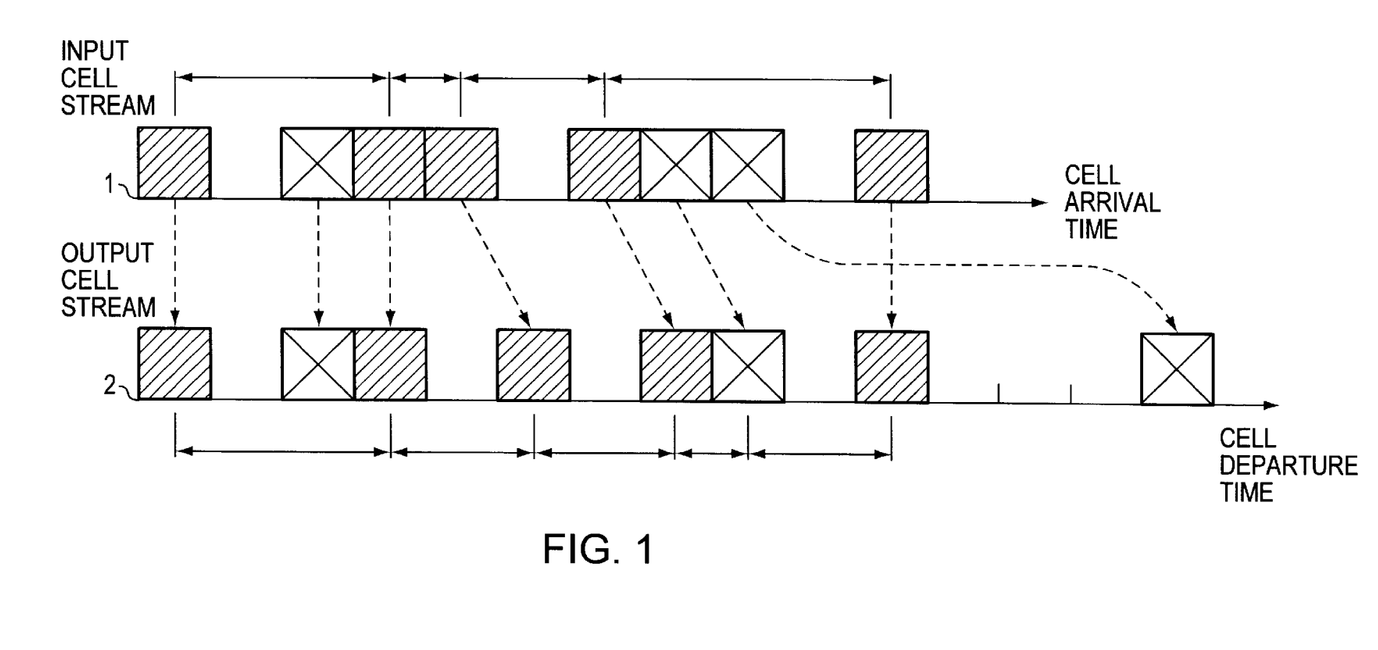
FIG. 1 illustrates the shaping principle.

FIG. 1 shows the shaping principle applied to the input cells stream 1. The shaded cells have been sent by a first user and the cells marked with a cross have been sent by a second user. The result of shaping is shown with the output cells stream 2: the cells marked with = have been moved and the departure time between two cells has become more regular. The spacing of the cells is done according to the bandwidth sharing required by the users: in the output cell stream, the departure time between two cells is smaller for the cells of the first user than for the second user's cells, because the first user has required a greater bandwidth share than the second user. Moreover, in the output stream the bursts of traffic have decreased: one can note that the groups of two cells belonging to the same connection of the input stream 1 have disappeared in the output stream 2.

The policing function is implemented in the access network nodes. The device implementing the policing function, the policer, is part of the high speed adapter cards; it controls and, if necessary, penalizes the traffic entering the network.

The shaping function is implemented in the devices accessing a network: they can be Customer Premise Nodes accessing an ATM network or a Network Node at the boundary of a first ATM network and intending to access another ATM network. As some Customer Premise Nodes can implement a policer, it is recommended to implement also the shaping function in the node at the boundary of a network connecting Customer Premise Nodes with policers. The device implementing the shaping function, the shaper, is also part of the high speed adapter cards and controls the sending of the output traffic cells.

Figure 2:
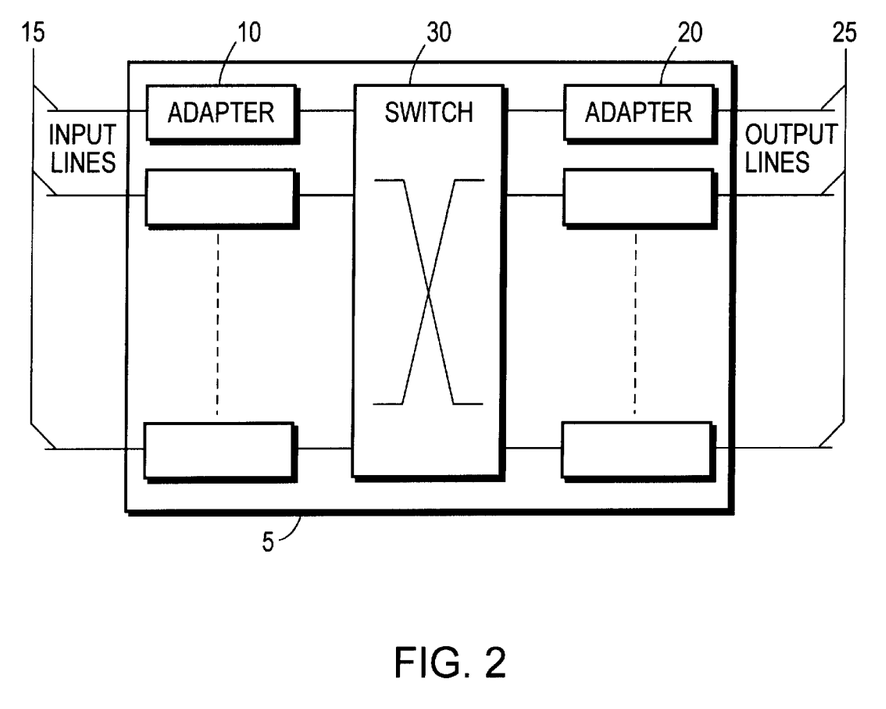
FIG. 2 is a block diagram of at ATM network node made to include this invention.

FIG. 2 shows a network node 5 which shall include shaper and policer functions. Reference numeral 15 designates the input lines conveying the input cell streams which are received by the input adapters 10; in each adapter the policer controls and penalizes, if necessary, the cell stream for each user. Then the cells are switched in the switch 30 and sent to the output adapters 20. In each output adapter 20 there is a shaper which spaces the cells which are sent to the output lines 25 as illustrated in FIG. 1.

Figure 3:
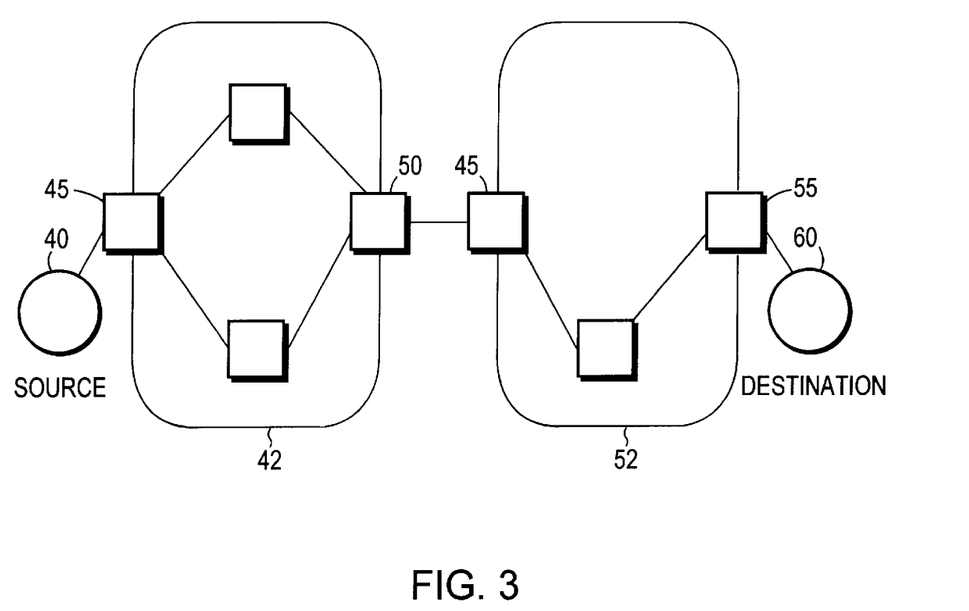
FIG. 3 shows the ATM network boundaries made to include the invention.

FIG. 3 shows an example of network topology to convey the traffic of users from the source unit 40 to the destination unit 60 through the networks 42 and 52. In these networks the nodes 45 are the access nodes; the policers are implemented in these access nodes 45. The shapers are implemented in the source unit 40 and in the node 50 which is at the boundary of the first network 42 and which accesses the second network 52. As the destination unit 60 may be a Customer Premise Node having implemented a policer, it is recommended to implement also a shaper in the node 55 located at the boundary of the network 52.

Many policing schemes have recently been studied; some of the most known are the leaky bucket, the jumping window, the moving window as described by Raif O. Onvural in his book entitled "Asynchronous Transfer Mode Networks: performance issues", Artech House edition. Without lack of generality, each policing function estimates one or more traffic parameters for a given period of time P. As this period of time P decreases, the policer may become non-transparent to users generating a traffic in conformance with the parameters negotiated at connection establishment time. On the other hand, as P increases, the policer takes longer to detect that the source exceeds its declared characteristics. However, the latter approach is more fair since it allows the user to generate a stream of cells that have short-term fluctuations. This is done at the expense of more memory requirements at the node level.

The only policing function proposed as a standard by the ITU (International Telecommunications Union), is the Generic Cell Rate Algorithm (GCRA). Details of the GCRA are given in the ATM Forum, "ATM User-Network Interface Specification", Version 3.0, 1994. Its role is, for each connection, to monitor the traffic arriving upstream according to the cell period T (T corresponds to the inverse of the peak cell rate R) and a given tolerance þ on this period. Basically, a cell is assumed to be conforming if the time elapsed between the arrival of two consecutive cells (belonging to the same connection) is greater than or equal to T−þ. If not, the cell is assumed to be non-conforming and is tagged and then, possibly discarded.

The policer discards cells not only because the source of traffic has violated the parameters negotiated at connection establishment but also because of a distorsion in the cell stream well known as jitter or Cell Delay Variation (CDV). This distorsion is due to the queuing of the cells at each intermediate network node and more generally the multiplexing of the cells on the output lines. The magnitude of the jitter depends on many parameters: the connection peak rate, the peak rate of the other connections that share the same link, the link load, the number of nodes passed through etc . . . . A consequence of the jitter is to induce, as the user cells travel through the network, some distortion on the traffic parameters declared by the source upstream. Especially, the instantaneous peak cell rate R' which may be modified and may pass beyond the value R declared by the source upstream at connection establishment time. In the worst case R'>R and the policing function with a short measurement interval (small period of time P) may take undesirable discarding actions. This is typically the case of the GCRA when the specified tolerance þ, named Cell Delay Variation Tolerance (CDVT), is small. That's why the shaping function will buffer cells so that the departure rate from a node is less that the arrival rate. It has been shown that the multiplexing of spaced cells tends to decrease the "burstiness" of the aggregate traffic and then allows a better utilization of the network resources. Policing and shaping control techniques should take into account the real-time constraints; as implemented in high speed network node adapters dealing with lines at several hundreds of Megabits per second. For example, the cell transmission time (cell time cycle) is about 2.7 $\mu$s for a line speed of 155.52 Mbps (OC-3), and less than 0.7 $\mu$s for a line speed of 622.08 Mbps (OC-12). This implies that the shaping and policing methods have a very short time to 'manage' an incoming call. For instance, assuming that only ten instructions are needed to both compute a cell transmission time and queue the cell to an output buffer; assuming that each instruction takes no more than one time cycle, the execution requires from the processor more than 14 Mips (Million of instructions per second) devoted to this task, for an OC-12 output link. Usually hardware devices are preferred and only simple computations (a few software instructions) and basic manipulations of cells are possible. As a consequence, shaping function will have to cope with a trade-off between complexity and performance and any step or device slowing-down the shaping process shall represent a serious drawback to the operability of the network.

Taking into account these above performance considerations, two shaping schemes are briefly examined hereunder.

The first one, relies on a very basic principle: the shaping function sends a given number, p, of cells at the link speed C, and keeps "silent" (i.e. the cells are buffered) till p(C/R−1).

If this approach requires no computation nor complex operations at the cell level, the CDV induced is quite bad and the tolerance that should be accommodated at the GRCA level to accept all the cells would be typically p(C/R-1).

The second one, more sophisticated, is detailed in Eugen Wallmeier and Tom Worster's article entitled "The spacing Policer, an algorithm for efficient peak bit rate control in ATM networks", published in the Proceedings of the of the XIV International Switching Symposium, Yokohama, Japan, Oct. 25–30, 1992. For an incoming cell of one connection, the time between two cell transmissions is such that the output peak rate is met, and the cell is queued to a list-of-cells that have to be sent at the same time tk. This list is referenced by the nth entry of a cyclic calendar with N inputs. A new entry of the calendar is sought at each cell time cycle, and the list-of-cells that have to be sent at time tn ($0 \leq n < N$) if any, is moved and queued to an output list. In short, the following operations are done at each cell time cycle:

Computing the transmission time ti for the incoming cell belonging to connection i Enqueueing the cell to the list-of-cells at the nth ($0 \leq n < N$) entry of the calendar.

Moving the list-of-cells of the current position m ($0 \leq m < N$) of the calendar to the output list.

Sending the first cell to the output list.

Incrementing the calendar position.

As one can see, the number of computations/manipulations is important. Moreover, the size of the calendar has to be quite large to support connections with small peak rate (large T). Although this algorithm gives good results in terms of CDV, it is impossible (without the knowledge of the aggregate incoming traffic pattern) to predict the jitter induced by the spacer. Therefore, the tolerance that should be accommodated at the GCRA must be quite large to ensure a minimal cell loss probability.

Most of the existing shaping schemes rely on the following principle: they compute a cell transmission time at each cell arrival, which depends on both current time and the time when the last cell was transmitted. For this reason, these shaping schemes may be referred to as cell-basis schemes. This is both time consuming and implying a heavy computing load.

A first improved method was proposed in the Copending European Application Number 94480086.1 to the same assignee. Said method is based on scheduling in advance the departure time of data cells provided by the network sources. The shaping is activated each time a change occurs in the traffic supported : new traffic added, end of traffic, modification in the traffic already established.

To that end, the proposed method consists in preparing in advance the departure of the cells for all the traffic established in the network node and which will be sent onto the output lines. For each output line, the cell stream is stored into two lookup tables called the calendars: the active calendar and the standby calendar.

While improving condiderably the traffic shaping, said method may, and does, lead to so-called colliding situations which affect the system performances.

One object of the present invention is to provide an improved method for shaping data cells transfers while minimizing the collision situations and therefore improving the system performances.

Another object of the present invention is to provide a hardware apparatus for implementing the method of this invention.

Still another object of the invention is to provide a mechanism allowing a fast resolution of the collisions detected during the write entries of an ATM shaping table.

These and other objects, characteristics and advantages of the invention, shall be more readily apparent from the following description of a preferred embodiment made with reference to the accompanying drawings.

SUMMARY OF THE INVENTION

This invention deals with a method and apparatus for shaping the output traffic in a fixed length cell switching network node, and more particularly with collision resolution means for an ATM shaper.

Accordingly, the invention deals with a method for shaping the data traffic in the transmit part of a high speed network node adapter driving output lines having a predefined bandwidth, said network node supporting switching fixed length data cells between source units and destination units, each said source units sending a source user traffic establishment time and information relative to the bandwidth sharing required, said adapter being equipped with a transmit device which reads the cells in a storage device and sends them onto said output lines at a rhythm defined by a table look-up operation of a so-called active calendar per each output line, each entry position of the calendar representing the position of one cell in the output line cell stream, while a so-called standby calendar is being updated at each change in the traffic supported by the considered line, and then swapped with the active calendar said method being characterized in that it includes:

splitting said calendars into so-called pages with n cells entries per page, n being a predefined number;

providing and associating to said calendars a Free Location Table organized into n-bits wide pages wherein each bit position in a page is associated to a cell entry position in the corresponding calendar page, said Free Location Table bit position being set either to 0 or to 1 depending on whether the corresponding calendar cell position is free or busy in the corresponding calendar page; whereby said calendar updating includes: for each new entry, locating the theoretical entry position in the standby calendar, defining the corresponding page, reading the corresponding Free Location Table page and should said Free Location Table page contain only ones, detecting a collision situation in which case the system looks for the nearest Free Location Table page including at least one free bit position, then performing an entry in the nearest free position of corresponding standby calendar page and updating the Free Location Table and the calendar accordingly; and, Swapping said active and standby calendars.

DETAILED DESCRIPTION OF A PREFERRED EMBODIMENT OF THE INVENTION

As already mentioned, the shaping function should be implemented to define the multiplexing sequence within a network output adapter or the transmit part of the adapter of a fixed length cell switching network node supporting node output lines. The nodes support transfer of information data for each node connected user between a source unit and a destination unit. To that end the method and apparatus of this invention shall prepare in advance the departure sequence of cells, for all the traffic established in the considered network node, and thus help monitoring said traffic onto each individual node output line accordingly.

Figure 4:
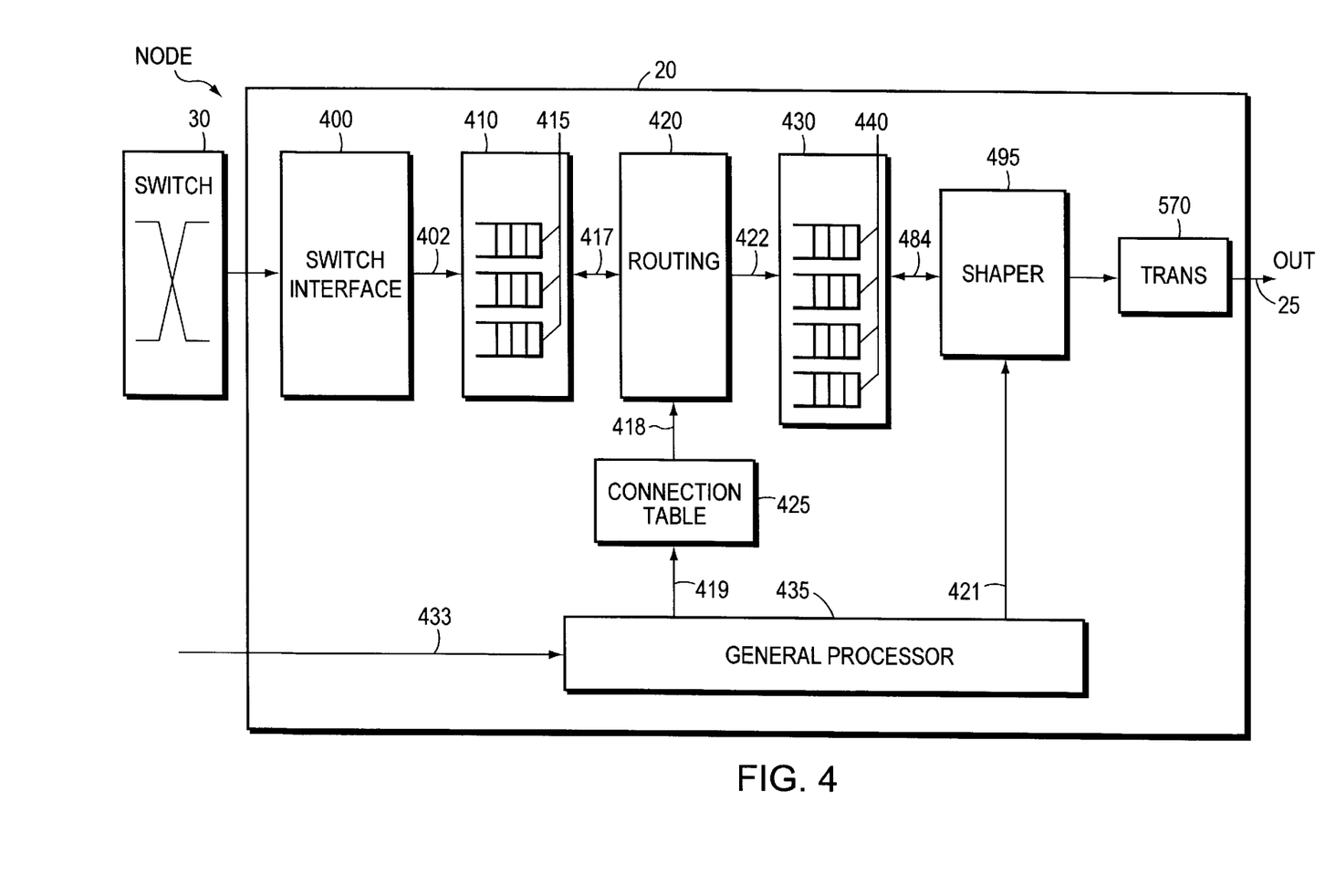
FIG. 4 is a block diagram of an output line adapter made to include the invention.

Represented in FIG. 4 is a block diagram of a transmit line adapter 20 located at an output of a node switch 30 switching data traffic between node input lines and node output lines. This line adapter receives the fixed length cells sent by the switch 30 of the network node through a switch interface device 400. Each fixed length cell contains a header including information on the Quality of Service (QoS) agreed upon by both user and network management. The switch interface 400 sends the cells into a node storage area 410 where they are stacked into different queues 415. Each queue corresponds to a different quality of service (QoS) and will be processed according to the corresponding priority. For instance said priorities may help discriminating between real-time (RT) data, and non real-time data, the latter including for instance pure non-real-time (NRT) data and Non-Reserved (NR) traffic data including network control data.

In parallel, a general processor 435 continually receives, via a link 433, the messages indicating connection establishment, and fills-up a connection table 425 with information read from said messages. For instance, in the connection table 425, the general processor 435 sends into each table entry an identifier of the input connection and an identifier of the output connection. The connection table 425 is used by a routing device 420. The router gets the cells, through the link 417, from the queues 415, starting with the queue with the highest priority; reads the input connection identifier in the cell header and gets the corresponding output connection identifier from the connection table 425. Then the router 420 writes, through the link 422, the considered cell in a queue 440 assigned to the corresponding connection within the storage area 430.

The traffic needs now to be shaped with a shaper mechanism 495 which shall multiplex the cells onto the node output line 25 while complying with quality of service and delay parameters specified for each user. To that end, and as already explained, the shaper of this invention needs to be updated at each network modification (e. g. new connection set-up or breakup for instance), and this updating should be realized with a minimum time delay.

Figure 5:
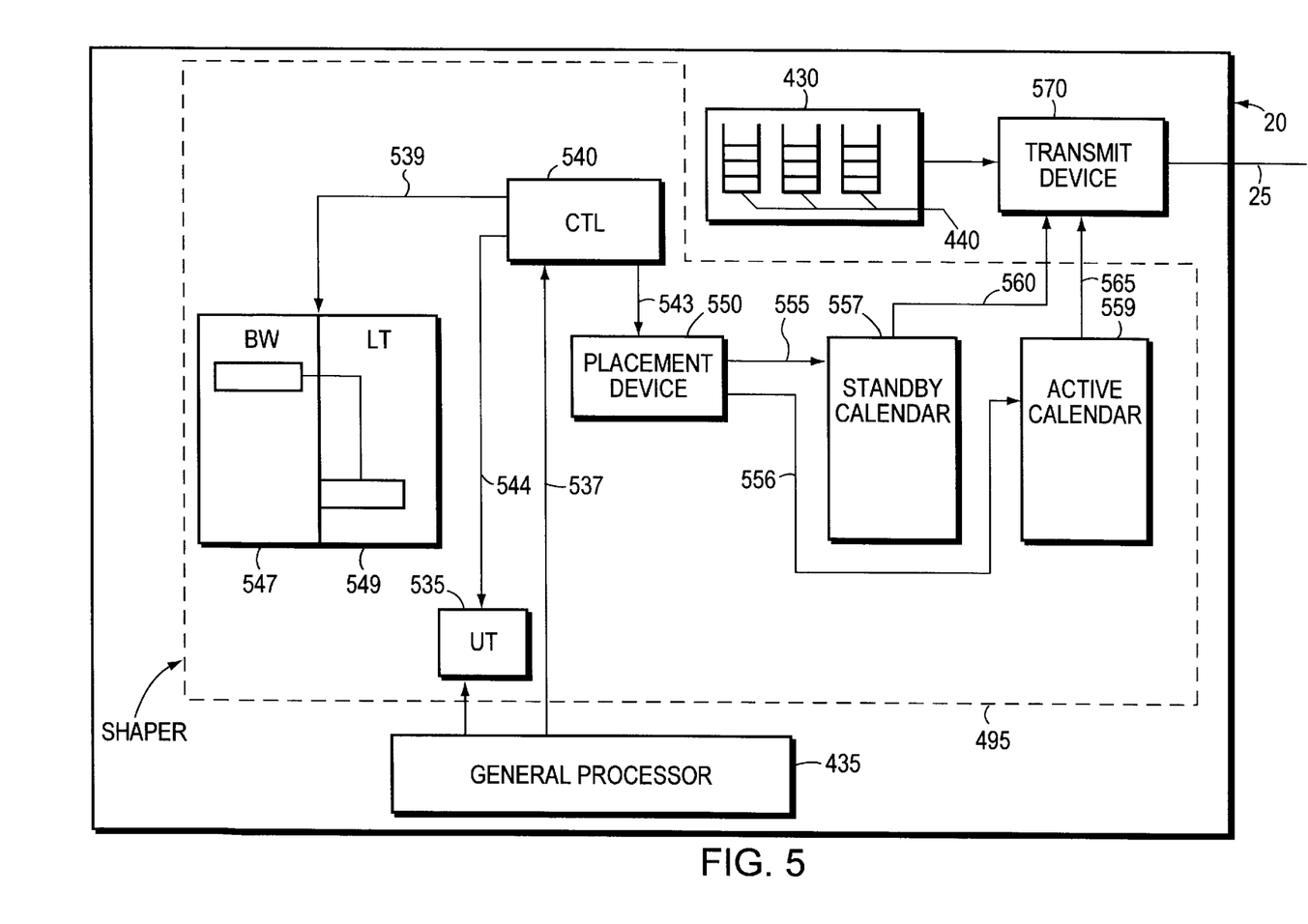
FIG. 5 is a block diagram of the shaper made to support the invention.

To that end, a system was already disclosed in the above mentioned copending application including the device of FIG. 5. Accordingly, the general processor 435 fills up a User Table (UT) 535 containing in each entry a traffic identifier and the number of entries to be reserved in a so-called, standby calendar 557 for the said traffic. The standby calendar operation is performed each time a traffic is added, changed or removed. While the standby calendar is being updated, the active calendar 559 controls the data cell multiplexing from the storage area 430 into the output line 25.

The general processor 435 of the node output adapter sends to a control device 540 of the shaper, via the link 537, the request for starting the standby calendar updating as User Table is ready. Then the control device 540 sorts the data related to the traffic and updates two tables: a Bandwidth (BW) table 547 with the traffic identifiers in the descending order of the bandwidth share, and pointing to the second table, i. e. the Link Table (LT) 549, keeping all the traffic identifiers having the same bandwidth share.

The control device (CTL) 540 sends through link 543, to a placement device 550, the data to update the standby calendar 557. These data are used by the placement device 550 which computes all the entries corresponding to one connection traffic. In parallel, the Active Calendar is scanned in sequence to control a transmit device 570 controlling the sequence of selection of cells which have been buffered into the buffers 440 and are to be transmitted via the node output line 25. Once the Standby Calendar is updated the traffic shaping control switches from calendar 559 to calendar 557 which becomes the active calendar. In other words, in this fixed length cell switching network, the shaping method implemented in the adapter, supporting the output lines, consists in scheduling in advance the departure time of the cells for each transfer of traffic between a source unit and a destination unit. This is implemented through the use of two table look-up mechanisms (one active and the other on standby) per each output line of the node adapters. The standby calendar 557 is updated at each traffic modification, then both calendars switch their functions with one another. This corresponds to a so-called swapping operation.

In operation, the active calendar is continuously read and the transmit device is activated at each entry read to send onto the output line the corresponding designated cell.

Figure 6:
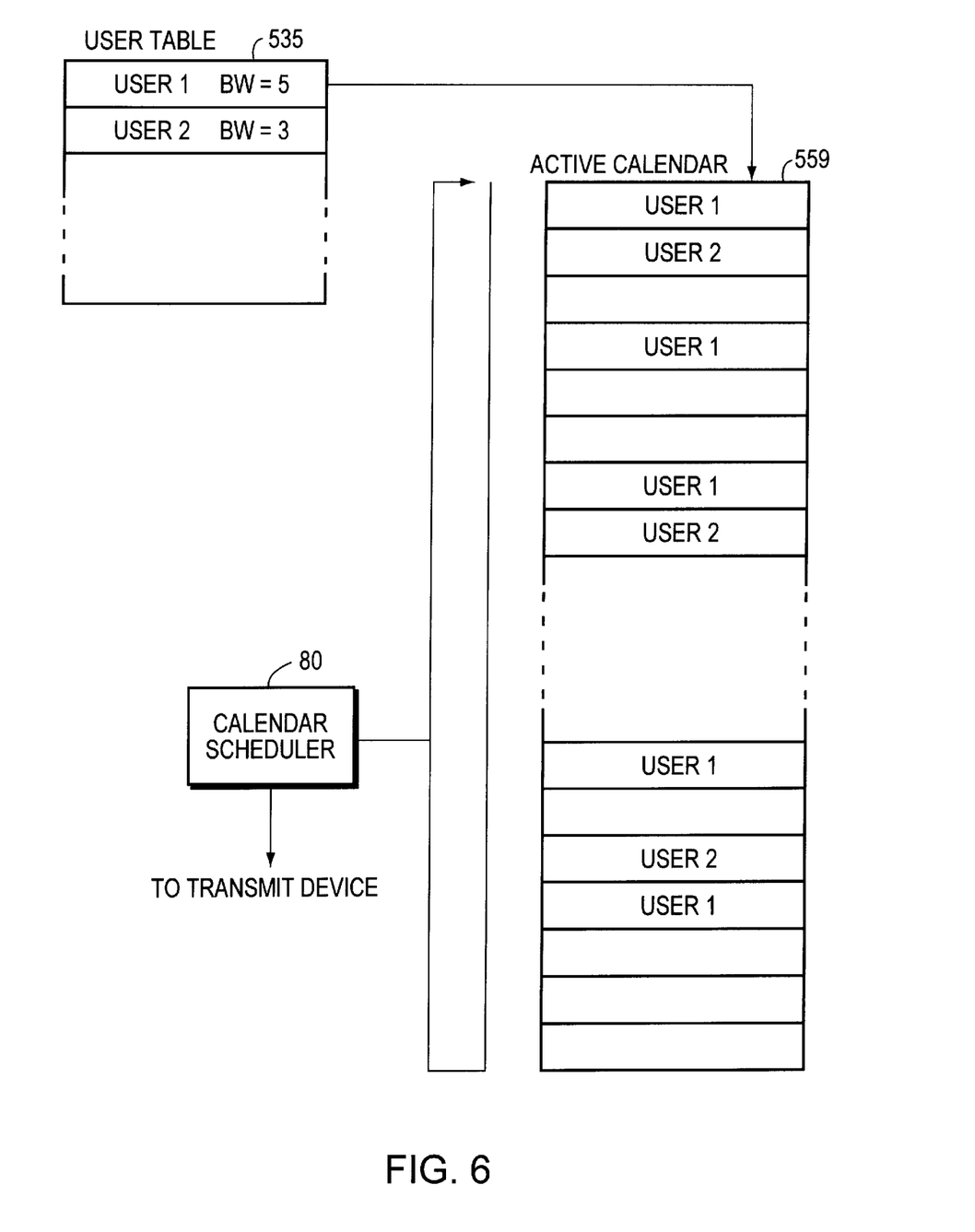
FIG. 6 illustrates the operation of a device of FIG. 5.

The above mechanism is schematically represented in FIG. 6. The active calendar 559 is cyclically scanned by a calendar scheduler 80. The User Table 535 includes next to each adapter user identification, the number of times the specified user should appear in the Calendar based on the user assigned bandwidth.

In operation, the standby calendar updating shall often face conflicting situations when a calendar position designated for a nominal entry is busy. One shall refer to that situation as a collision requiring looking for a neighbouring free position. In the above mentioned co-pending application the calendar user positions are organized in a cell size. This, unfortunately induces a high number of collisions and therefore leads to a slow calendar build-up. This is a serious drawback in a high speed network environment made to process an important number of entries.

More precisely, said calendar updating operates as follows:

1. Calendar is cleared
2. Building of the calendar starts with the connection which has the highest share of the bandwidth (or first in sequence for same value)
3. First entry of the calendar is updated with the ID of the connection. Then all subsequent entries are evenly distributed so that the number of entries matches exactly the bandwidth fraction granted to the current user.
4. Calendar building continues with the next user. The first found empty slot is used for the first entry of the next user. Then all other entries are evenly distributed from that point. However, unless the next user is an integer division of the previous one, collisions are going to occur. The next closest free position around the ideal position is searched for, until an empty slot is found.

5. The above step repeats until the calendar is filled with all user entries.

This process may be considered too slow. For instance, for a calendar size of 16384 entries, with 300 users with many connections implying a number of entries into the calendar close to each other but not equal (bandwidths ranging from 119 to 5 Mbps). Using a total of 16350 entries, 313756 acollisions were detected. Accordingly, the elapsed time devoted to building an updated calendar was found to be about 54.4 ms. This is not acceptable in terms of performance.

With the same parameters, the present invention required only 6.3 ms to build-up the calendar. The corresponding performance is therefore increased by a factor of 8.6 with less than 1% impact on cell delay variation. Bearing in mind the comments made about and relating to the invention background, one may easily understand the importance of the improvements provided by this invention from a practical stand-point.

The basic principle of the invention is to format the calendars into pages having n entries, rather than into cells providing for only one entry, as in the prior art. Furthermore, a Free Location Table 700 is provided for use with the calendars (see FIG. 7). There is one Free Location Table address per page. The page size is defined by the width of the Free Location Table. Each bit of the free location table is associated to a calendar cell address. Then each bit position of the Free Location Table shall indicate whether the corresponding calendar cell address is free (bit at zero) indicating that no entry was already assigned this cell position. Conversely, a bit set to one in the Free Location Table shall indicate that the corresponding calendar address is busy.

Before building the calendar, the so-called Free Location Table is cleared with all table bit locations reset to zero.

Figure 7:
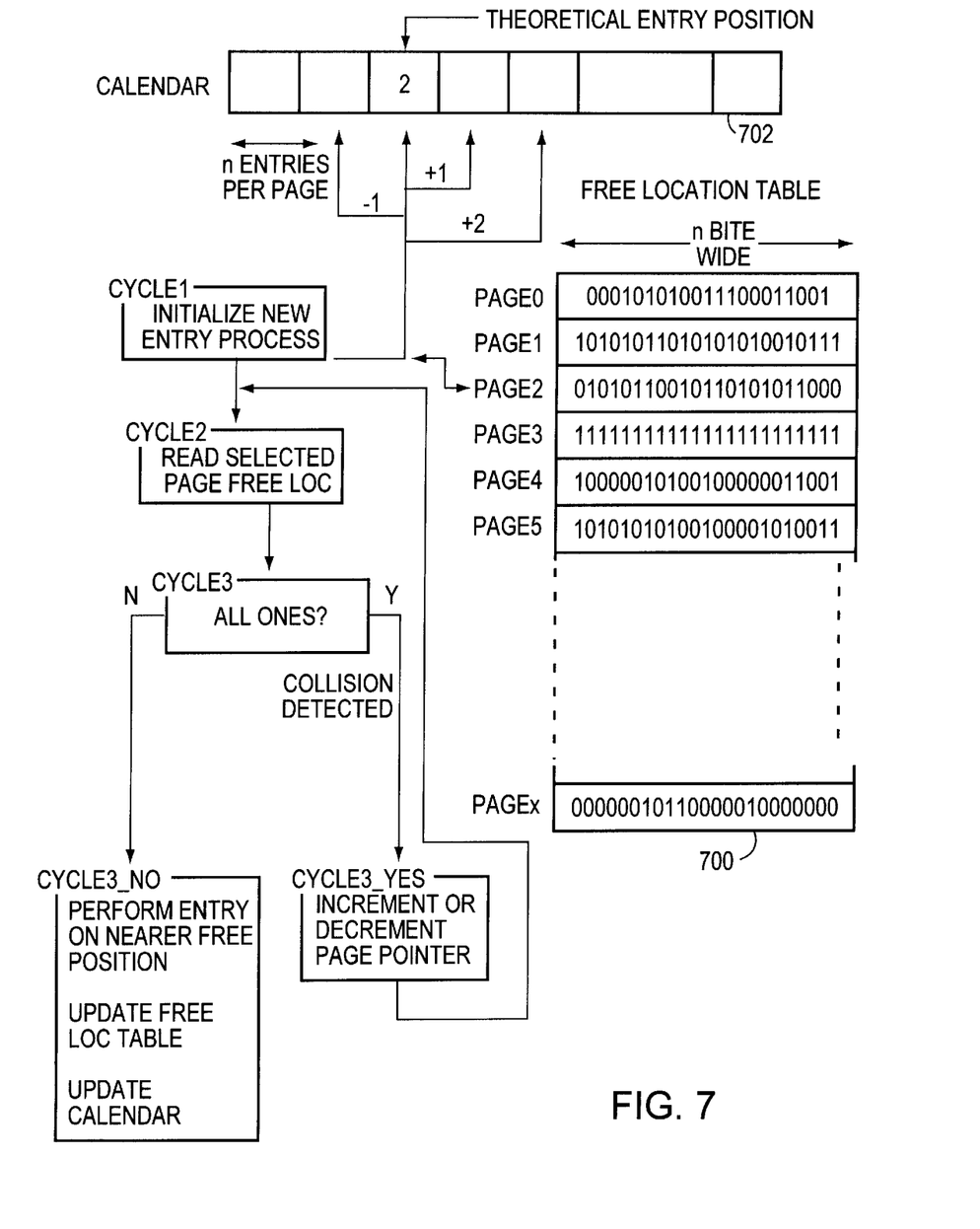
FIG. 7 provides a functional representation of the device of the invention.

Represented in FIG. 7 is an n-bits wide RAM location storing the Free Location Table 700, with pages sequentially ranging from page 0 through page X, covering the whole calendar. Accordingly, the calendar 702 is split into (x+1) pages also ranging from page 0 through page x, with each page having n entries per page where each entry includes a cell address. For each new nominal entry, the highest weighted bit(s) (i.e. most significant bits) are used to address the Free Location Table page. Said page is read. Should it contains only "ones" in all the selected page bit positions, as exemplified by page 3 of the Free Location Table 700 then collision is considered detected. A page pointer is incremented or decremented one unit according to a predefined search sequence, e. g. +1, −1, +2, −2 . . . until a Free Location Table page containing at least one bit free (i. e. at zero) is reached, in which case, an entry is performed in the nearest free position in the calendar and the corresponding Free Location Table bit position is set to one.

As it shall be described with reference to a best mode of implementation of this invention, the required hardware is quite simple. In practice, two counters are used to perform a calendar entry. The first one (COUNTER+) is used to scan the Free Location Table from the theoretical targetted position to its end. The second one (COUNTER−) is used to scan the Free Location Table from the theoretical position to its begining. A simple flip-flop latch may be used to determine whether the (COUNTER+) or the (COUNTER−) must be used to address the Free Location Table. For instance when the latch is set to zero, the (COUNTER−) is used to address the Free Location Table; otherwise, when the latch is set to one, the (COUNTER+) is used to address the Free Location Table. An "entry address" register holds the calendar address where the entry should be performed. The most significant bits are used as page bits to address the Free Location Table. The least significant bits are used as position bits to determine the entry bit position in a page. A page status register holds the page status read out of the Free Location Table. The whole process shall require three cycles C1, C2 and C3, with cycle C3 implying a conditional step leading either to a Cycle 3_Yes (C3_Y) or to a Cycle 3_No (C3_N).

Figure 8:
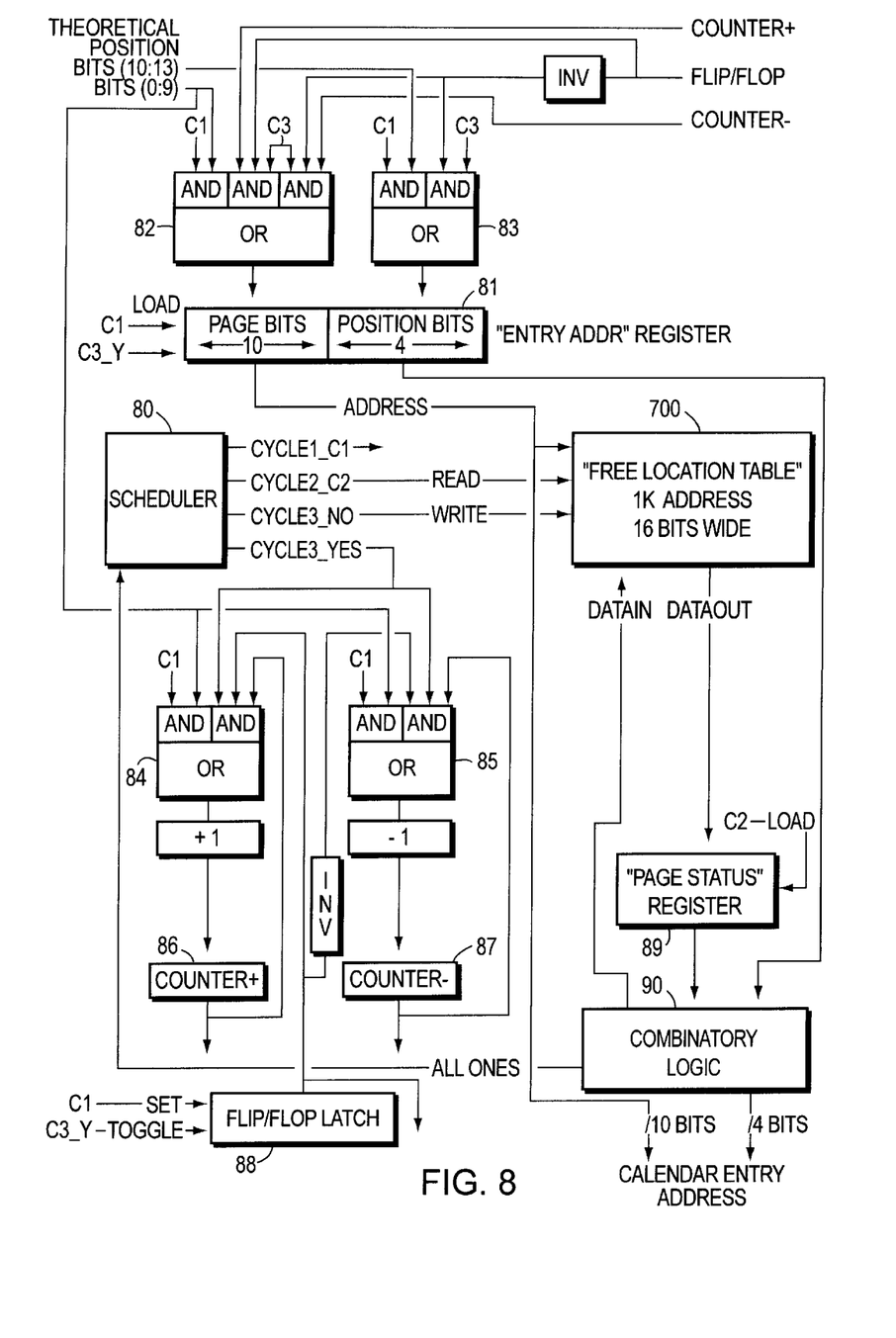
FIG. 8 shows a block diagram of the hardware used to implement the invention.

Represented in FIG. 8 is a block diagram showing the hardware used in the best mode of implementation of this invention assuming a 16K address calendar and a 1K address Free Location Table (Table being 16 bits wide) are used. More precisely the Table shall include 1024 pages.

The calendar scheduler 80 monitors the process by providing the C1 through C3 timing cycles.

The Entry Address register 81 is split into two parts, a first part (ten bits wide part) is used to store page address; the second part (four bits wide part) is made to store position bits within the addressed page. Said Entry Address register parts are controlled through logic circuits 82 and 83, respectively. The logic circuit 82 is made of three sets of AND gates driving a common OR gate. The ten high weighted bits (bits 0–9) of the theoretical entry position to the calendar are ANDed into first set of AND gates (1) when clocked by C1. The second AND gate set (2) is fed with the COUNTER+ and the flip-flop latch output while being clocked with C3. The third AND gate set (3) is fed with the COUNTER− output and the complemented output of the flip-flop latch, while being also clocked by C3. These three AND gate sets output are ORed to control operation of the ten bits wide (page bits) portion of the Entry Address register 81.

The logic circuit 83 is made of two AND gate sets (4 and 5) to be ORed to drive the four-bits wide (position bits) of the Entry Address register 81. The first AND gate set (4) receives, as entry, the four lowest bits (bits 10–13) of the theoretical position while being controlled by C1. The last AND gate set (5) receives the inverted flip-flop latch 88 bit while being controlled by C3.

The 10 most significant (i.e. highest weighted) bits of the Entry Address register 81 are used as address pointer, to point at a page of the Free Location Table 700 and also provide the output information on the highest ten bits of the calendar entry address.

The Scheduler calendar 80 is also used to control read and write operations within the Free Location Table 700.

Also provided in this circuit are two logic circuits 84 and 85 each including AND gate sets feeding OR gates. A first AND gate set of logic circuit 84 is fed with bits zero through nine of the theoretical position, while being controlled by the signal C1. The output of said first AND gate set is used to increment the COUNTER+ device (86) by one unit. Said COUNTER+ output is then fed back as input to the second AND gate set of logic circuit 84. Said second AND gate set of logic circuit is also fed with a flip-flop latch (88) output and controlled by Cycle3_Yes signal provided by the scheduler 80. The flip-flop latch 88 is set by C1 and toggled by Cycle3_Yes, both provided by the scheduler 80.

On the other hand, the bits zero through nine of the theoretical position are provided to a first AND-gate set of logic circuit 85, controlled by C1, to decrement the COUNTER− (87), one unit. Said COUNTER− output is fed back as input to a second AND gate set of logic circuit 85 also fed with the C3_Yes signal, and controlled by the inverted flip-flop latch 88 output.

The data-out provided upon reading a Free Location Table page are loaded in the Page Status register 89 under the control of C2 signal. The Page Status register feeds a Combinatory logic device 90 also connected to receive the four position bits from the Entry Address register 81. The combinatory logic device 90 provides the four low weight bits of the calendar entry address, as well as data_in input to the Free Location Table 700 and an all_ones indication to the scheduler 80.

In operation, the process to perform a calendar entry is operated within the mentioned three cycles executed as follows:

Cycle 1: Initialization

The theoretical calendar entry position is loaded into the "Entry Addr" register 81. The most significant bits of the "Entry Addr" give the selected page address into the Free Location Table. The less significant bits of the "Entry Addr" give the theoretical calendar entry position into the selected page.

Simultaneously to the "Entry Addr" register load operation, the COUNTER+ is initialized with the "Entry Addr" value incremented by one and the COUNTER− is initialized with the "Entry Addr" value decremented by one. On its side the flip/flop latch 88 (in charge of the future page address plus or page address minus selection when a collision is detected in the current page) is set to one.

Cycle 2: Read "Free Location Table"

A read of a Free Location Table position (ie "calendar page image") is performed during the Cycle 2 at the address given by the "Entry Addr" register 81. The Free Location Table position content is transferred into the "Page Status" register 89.

Cycle 3: "Is there no remaining free position into the selected page ?"

Two cases are possible:
- either the answer is positive (collision situation). The process follows the "Cycle 3 Yes" branch of the flowchart represented in FIG. 7. A collision status is detected when all the "Page Status" register bits are seen set to one. or
- It remains a free position into the selected page. The process follows the "Cycle 3 No" branch of the flowchart. A calendar entry can be performed into the current page position as close as possible to the theoretical position.

"Cycle 3 Yes branch" process. A Collision has been detected

When the Flip/Flop latch 88 is set to one, the COUNTER+ gives the next Free Location Table position to be read (next page address). On the contrary, when the Flip/Flop latch 88 is set to zero, the COUNTER− gives the next Free Location Table position to be read.

When the COUNTER+ is selected, its current value is loaded into the "Entry Addr" register 81 in place of the page bit range (most significant bits). The "positions bits" are cleared (set to 0) in order to give a new theoretical position in the new page which is set as close as possible to the previous one. The COUNTER+ is incremented again and the flip/flop latch is set to its opposite value to get a COUNTER− selection in the case where a new collision is detected in the new "plus selected page".

When the COUNTER+ is selected (Flip Flop latch set to zero), its current value is loaded into the "Entry Addr" register 81 in place of the page bit range (most significant bits). The "positions bits" are set (set to 1). The COUNTER− is decremented again and the flip/flop is set to its opposite value to get a COUNTER+ selection in the case where a new collision will be detected in the new "minus selected page".

The process will loop between cycle 3 to cycle 2 until a free position is found in a page of the calendar.

"Cycle 3 No" branch process. A free position is found into the current page.

The calendar entry is performed at the page address given by the "Entry addr" register 81 most significant bits. The exact position into the calendar page is given by the logic in charge of the detection of the remaining free position. The free position is assumed to be located as close as possible to the theoretical position.

The bit corresponding to this position is set to one into the free location table page. It indicates now that this calendar location is busy.

The above detailed operating cycles are summarized in FIG. 8. Accordingly at cycle 1, a new entry process is initialized. Then cycle 2 is made to read the selected Free Location Table location pointed at. Said page bits are analyzed at cycle 3. Should these bits be all ones, a collision situation is considered detected, and Cycle 3_Yes (C3_Y) is initialized leading to the page pointer being incremented or decremented (alternatively), and the process loops back to cycle 2. On the contrary, should the page bits read at the begining of Cycle 3 contain at least one zero the Cycle 3_No (C3_N) is initiated. This cycle is used to perform an entry for the currently processed cell in the nearest free position within the considered page. Then, both the Free Location Table and the Calendar are updated accordingly.

Eventhough the proposed method may lead to some cell delay variation (CDV), the impact on CDV may be made relatively small, i. e. equal to the Free Location Table width divided by the calendar size. For instance, for a calendar size of 16 384 entries and a 16-bits wide Free Location Table, the CDV shall be 16/16 384=0.97% which remains fully acceptable in practice under current operating conditions.

What is claimed is:

1. In a network node adapter for converting a plurality of fixed-length data cells, received from users at multiple source units, into an output data stream transmitted to a destination unit via an output line, the output line having a predefined bandwidth, the bandwidth allocated among the users at call establishment time, the bandwidth allocation based on information supplied by the source units, the adapter including: i) memory means for storing the plurality of data cells received from the source units, the memory means providing a corresponding memory location for each stored data cell, ii) an active calendar defining the sequence of data cells to be placed onto the output line, iii) a standby calendar which is updated when a new source connection is established or when an existing source connection is disestablished, and iv) transmission means responsive to the active calendar for transmitting the stored data cells via the output line, a method for shaping the output data stream so as to mitigate cell delay variation, said method comprising the steps of:

formatting the standby calendar into a plurality of m pages, where m is a predefined number, each said page comprising a plurality of n data cell entry positions, where n is a predefined number;

generating a standby free location table comprising a plurality of m addressable locations, a $j^{th}$ said addressable location corresponding to a $j^{th}$ said standby calendar page, where $0 \leq j \leq (m-1)$, each said addressable location further comprising a plurality of n bits, an $i^{th}$ said bit in said $j^{th}$ addressable location corresponding to an $i^{th}$ said data cell entry position in said $j^{th}$ standby calendar page, where $0 \leq i \leq (n-1)$;

in response to a transmission request, copying the plurality of data cell memory locations into said plurality of data cell entry positions in a predetermined sequence; and changing said $i^{th}$ bit in said $j^{th}$ addressable location from a vacant state to an occupied state when, at most, one of the plurality of data cell memory locations is copied into said $i^{th}$ data cell entry position in said $j^{th}$ standby calendar page.

2. The method of claim 1 wherein m is substantially 1024.

3. The method of claim 1 wherein n is substantially 16.

4. The method of claim 1 further comprising the step of providing a user table preceding said step of copying the plurality of data cell memory locations, said user table comprising a list of the users and, for each said listed user, a number specifying the number of said data cell entry positions provided to the corresponding said listed user in said standby calendar, said number of provided data cell entry positions being a function of the bandwidth allocated to the corresponding said listed user.

5. The method of claim 1 wherein said step of copying the plurality of data cell memory locations comprises the steps of:

reading a $k^{th}$ said addressable location in said standby free location table, where $0 \leq k \leq (m-1)$;

examining one or more of said bits in said $k^{th}$ addressable location; and if an $l^{th}$ said bit is found to be in a vacant state, where $0 \leq l \leq (n-1)$, copying a selected one of said plurality of data cell memory locations into an $l^{th}$ said data cell entry position in a $k^{th}$ said standby calendar page.

6. The method of claim 5 wherein said step of copying the plurality of data cell memory locations further comprises the steps of:

if no said bit in a said vacant state is found, reading a $(k-1)^{th}$ said addressable location in said standby free location table, where $0 \leq (k-1) \leq (m-2)$;

examining one or more of said bits in said $(k-1)^{th}$ addressable location; and if an $l^{th}$ said bit is found to be in a vacant state, copying a selected one of said plurality of data cell memory locations into an $l^{th}$ said data cell entry position in a $(k-1)^{th}$ said standby calendar page.

7. The method of claim 5 wherein said step of copying the plurality of data cell memory locations further comprises the steps of:

if no said bit in a said vacant state is found, reading a $(k+1)^{th}$ said addressable location in said standby free location table, where $1 \leq (k+1) \leq (m-1)$;

examining one or more of said bits in said $(k+1)^{th}$ addressable location; and if an $l^{th}$ said bit is found to be in a vacant state, copying a selected one of said plurality of data cell memory locations into an $l^{th}$ said data cell entry position in a $(k+1)^{th}$ said standby calendar page.

8. The method of claim 5 wherein said $k^{th}$ addressable location comprises a theoretical location for the data cell memory location being copied.

9. The method of claim 1 wherein the standby calendar is exchanged with the active calendar such that the standby calendar defines the sequence of data cells to be placed onto the output line and the active calendar is updated when a new source connection is established or when an existing source connection is disestablished.

10. The method of claim 1 further comprising the step of generating an active free location table comprising a plurality of m addressable locations, a $j^{th}$ said addressable location corresponding to a $j^{th}$ said active calendar page, each said addressable location further comprising a plurality of n bits, an $i^{th}$ said bit in said $j^{th}$ addressable location corresponding to an $i^{th}$ said data cell entry position in said $j^{th}$ active calendar page.

11. The method of claim 1 wherein said predetermined sequence is a function of the bandwidth allocation.

12. An apparatus suitable for use in a network node adapter for converting a plurality of fixed-length data cells, received from users at multiple source units, into an output data stream transmitted to a destination unit via an output line, the output data stream shaped so as to mitigate cell delay variation, the output line having a predefined bandwidth, the bandwidth allocated among the users at call establishment time, the bandwidth allocation based on information supplied by the source units, the adapter including: i) memory means for storing the plurality of data cells received from the source units, the memory means providing a corresponding memory location for each stored data cell, ii) an active calendar defining the sequence of data cells to be placed onto the output line, iii) a standby calendar which is updated when a new source connection is established or when an existing source connection is disestablished, and iv) transmission means responsive to the active calendar for transmitting the stored data cells via the output line, said apparatus comprising:

means for fomatting the standby calendar into a plurality of m pages, where m is a predefined number, each said standby calendar page comprising a plurality of n data cell entry positions, where n is a predefined number;

a standby free location table comprising a plurality of m addressable locations, a $j^{th}$ said addressable location corresponding to a $j^{th}$ said standby calendar page, where $0 \leq j \leq (m-1)$, each said standby free location table addressable location further comprising a plurality of n bits, an $i^{th}$ said bit in said $j^{th}$ addressable location corresponding to an $i^{th}$ said data cell entry position in said $j^{th}$ standby calendar page, where $0 \leq i \leq (n-1)$;

means for copying the plurality of data cell memory locations into said plurality of data cell entry positions in a predetermined sequence; and means for changing said $i^{th}$ bit in said $j^{th}$ addressable location from a vacant state to an occupied state when, at most, one of the plurality of data cell memory locations is copied into said $i^{th}$ data cell entry position in said $j^{th}$ standby calendar page.

13. The apparatus of claim 12 further comprising:

means for formatting the active calendar into a plurality of m pages, each said active calendar page comprising a plurality of n data cell entry positions; and an active free location table comprising a plurality of m addressable locations, a $j^{th}$ said addressable location corresponding to a $j^{th}$ said active calendar page, each said active free location table addressable location further comprising a plurality of n bits, an $i^{th}$ said bit in said $j^{th}$ addressable location corresponding to an $i^{th}$ said data cell entry position in said $j^{th}$ active calendar page, where $0 \leq i \leq (n-1)$.

14. The apparatus of claim 12 wherein said predetermined sequence is a function of the bandwidth allocation.

15. The apparatus of claim 12 further comprising a user table, said user table comprising a list of the users and, for each said listed user, a number specifying the number of said data cell entry positions provided to the corresponding said listed user in said standby calendar, said number of provided data cell entry positions being a function of the bandwidth allocated to the corresponding said listed user.

16. The apparatus of claim 12 further comprising an entry address register means for providing an address pointer to said means for copying, said address pointer specifying said $j^{th}$ addressable location such that at least one said data cell memory location is copied into said $j^{th}$ standby calendar page.

17. The apparatus of claim 12 further comprising means for incrementing said address pointer such that at least one said data cell memory location is copied into said $(j-1)^{th}$ standby calendar page.

18. The apparatus of claim 12 further comprising means for decrementing said address pointer such that at least one said data cell memory location is copied into said $(j-1)^{th}$ standby calendar page.

19. In a network node adapter for switching fixed-length data cells between source units and destination units via output lines, each output line having a predefined bandwidth allocated at call establishment time based on information supplied by the source units, among the source units, the adapter including: i) a storage device for storing data cells received from the source units, ii) sequence defining means stored in the storage device for defining the transmission sequence of the cells received from the source units and stored in the storage device, and iii) transmission means responsive to the sequence defining means, the transmission means for accessing the stored data cells and transmitting the source data cells over an output line under control of the sequence defining means, an apparatus responsive to changes in cell connection requirements for updating the sequence defining means, said apparatus comprising:

means for storing and accessing the sequence defining means in pages, each said page comprising n data cell entry positions, where n is a predefined number, each said data cell entry position for storing indicia pointing to a data cell location;

means for establishing and maintaining a free location table, said free location table comprising m addressable locations, where m is a predefined number, each of said addressable locations corresponding to one of said pages storing the sequence defining means, each said addressable location comprising n bits, each said bit corresponding to one of said data cell entry positions in the corresponding sequence defining means page, each of said bits having a first state for indicating that the corresponding said data cell entry position is occupied and a second state indicating that the corresponding said data cell entry position is vacant;

reading means responsive to a change in connection requirements, for reading a predetermined addressable location in said free location table;

examination means for examining said n bits read by said reading means, to locate at least one said bit in said second state;

means for changing to another said predetermined addressable location if no said second state bit is found, said means for changing alternately incrementing and decrementing the predetermined addressable location until a said bit in said second state is found; and, means for updating the sequence defining means in accordance with said change in said predetermined addressable location.

* * * * *